Feb. 25, 1958 A. B. TAYLOR 2,824,912

ELECTRICAL TROLLEY SYSTEM SUPPORT

Filed Sept. 17, 1953 2 Sheets-Sheet 1

INVENTOR
ASHTON B. TAYLOR

BY Smith, Michael & Gardiner
ATTORNEYS.

ELECTRICAL TROLLEY SYSTEM SUPPORT

Filed Sept. 17, 1953 2 Sheets-Sheet 2

INVENTOR
ASHTON B. TAYLOR.

BY Smith, Michael & Gardiner
ATTORNEYS

United States Patent Office 2,824,912

Patented Feb. 25, 1958

2,824,912

ELECTRICAL TROLLEY SYSTEM SUPPORT

Ashton B. Taylor, Pittsburgh, Pa.

Application September 17, 1953, Serial No. 380,645

5 Claims. (Cl. 191—35)

This invention relates to an electrical trolley system which embodies a conducting bus bar with which a collecting shoe cooperates to collect and supply electrical energy to points remote from the trolley.

More particularly, the invention relates to the means employed for supporting the bus bar so as to be extremely rigid and strong and yet permit relative sliding movement between the bus bar and its support. This is essential since in many installations, the bus bar extends for hundreds or even thousands of feet, and since the structures to which the bus bar supports are attached as well as the bus bar will contract and expand under different temperature conditions, it is obvious that if the bus bar clamp did not permit such sliding movement, warpage, fracture or other damage to the bus bar would occur.

In systems wherein bus bars are used, it is imperative that they be shielded so as to prevent accidental contact with the live portions thereof and the support for the bus bar must not in any way interfere with the proper functioning of the shielding member while at the same time being firmly pressed into engagement with the bus bar.

It is elso essential that the support for the bus bar be so constructed that stresses and strains incident to use will not loosen or injure the support so that the support is at all times rigid and fixed to properly support the bus bar.

The present invention carries out the foregoing objects in a simple, highly efficient manner by means of supporting members which may be cheaply made, easily and quickly installed by any laborer and while some of the objects have been enumerated, other objects and advantages will be apparent from the following description taken in connection with the accompanying drawings in which.

Figure 1:
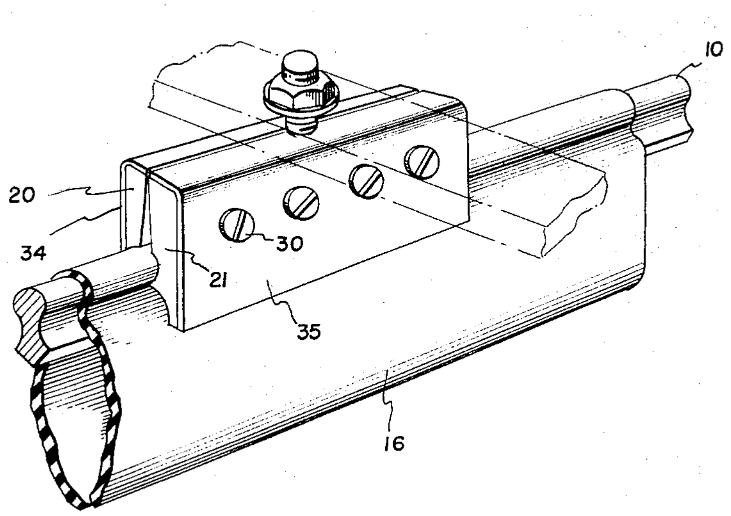
Fig. 1 is a fragmetnary prospective view.
Figure 2:
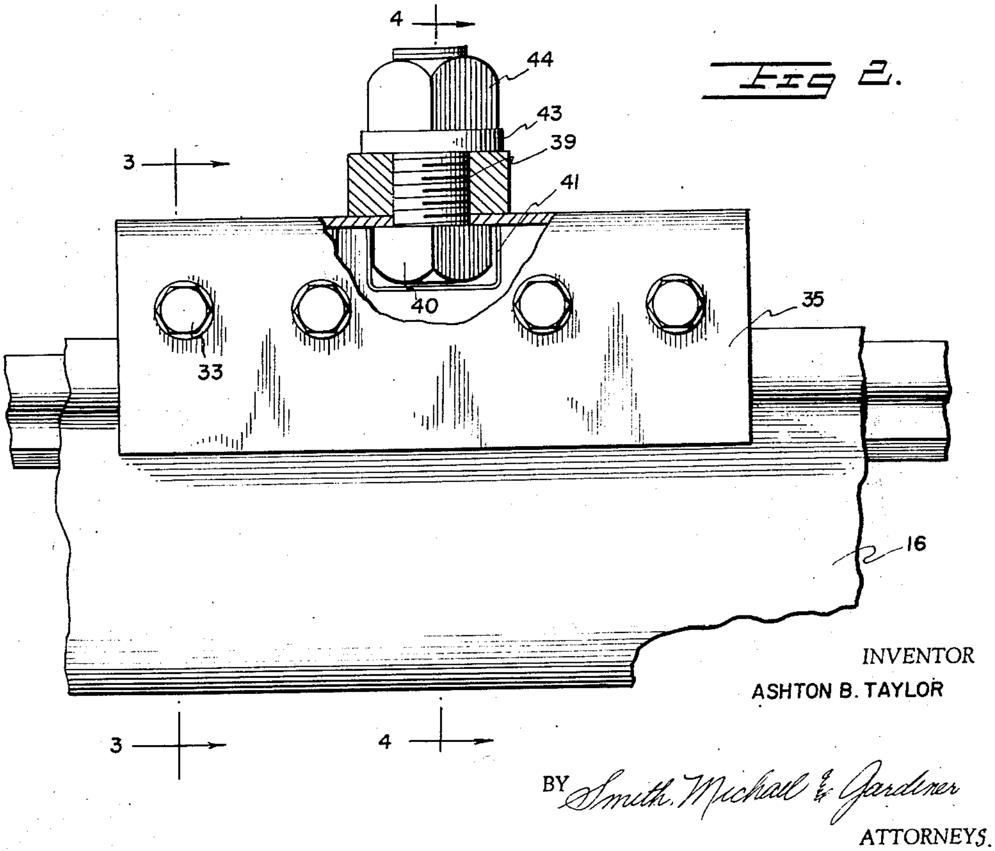
Fig. 2 is a side elevation with a portion broken away.
Figures 3, 4:
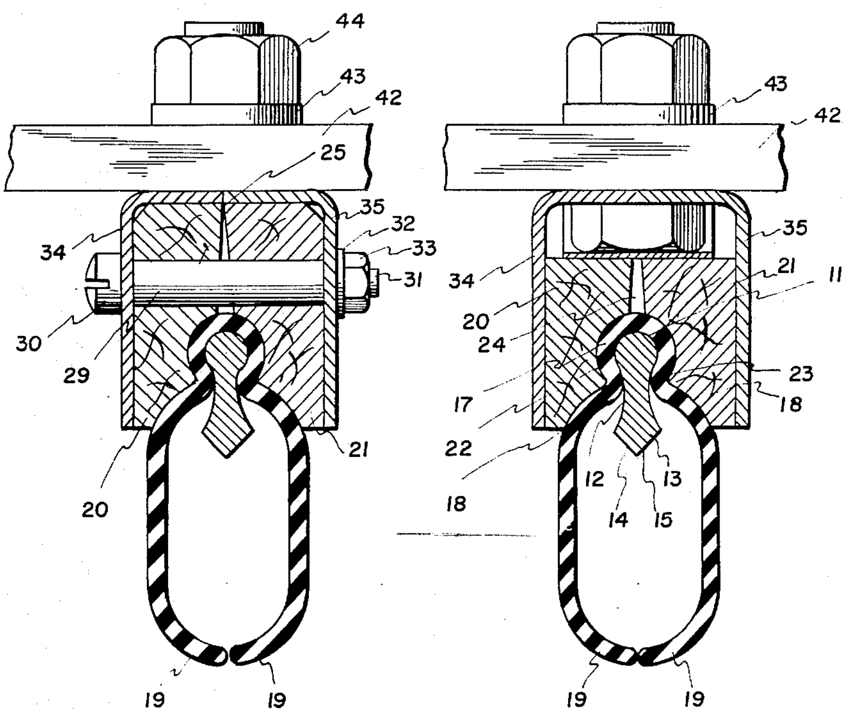
Fig. 3 is a sectional view along the line 3—3 of Fig. 2.
Fig. 4 is a sectional view along the line 4—4 of Fig. 2.
Figure 5:
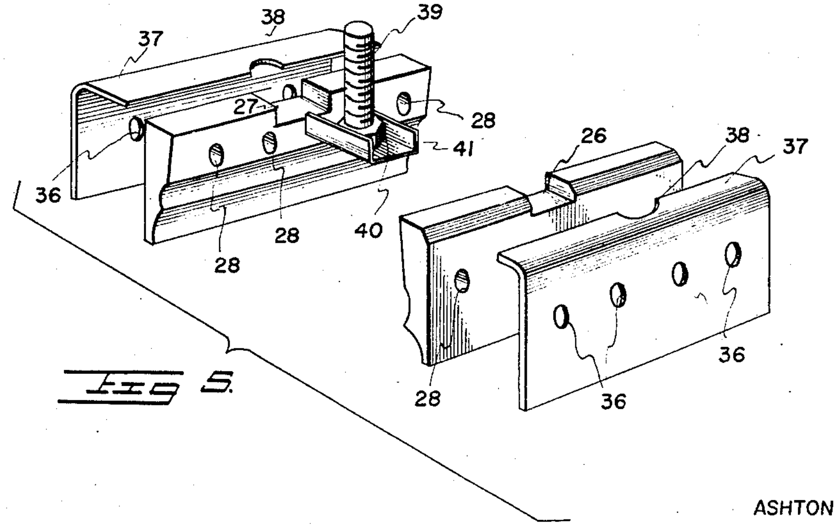
Fig. 5 is an exploded view of the bus bar clamp.

Referring more particularly to the drawings, there is shown a bus bar 10 having the cross section as shown and which, in the trade is known as a figure 8 bus bar. It consists of an elongated, generally flat strip of copper, copper alloy or other good conducting metal having a rounded upper edge 11, a constricted waist portion 12 and an enlarged lower edge 13 formed with converging flat faces 14 and 15 adapted to contact a sliding shoe having its engaging face complemental to the faces 14 and 15.

In systems using bus bars, it is universally required that they be shielded so as to eliminate the danger of accidental contact therewith and in the present invention, a flexible and resilient shield or guard 16 is mounted on the bus bar and extends throughout the length thereof.

The shield 16 is provided along its upper edge with a tubular socket 17 snugly embracing the rounded upper edge 11 of the bus bar and with outwardly flared wing portions 18 on opposide sides of the bus bar which terminate in vertically and downwardly extending portions provided with inturned ends 19 projecting toward each other and being substantially in contact with each other to enclose the conductor bus.

The collector shoe which engages and rides along the bus bar projects between the inturned ends 19 and since the shield is flexible and resilient the ends separate, and then return to substantially closed position as the shoe moves along the bus bar.

The shield 16 may be made of any insulating material that will accomplish the desired results, one such material being Koroseal.

The support for the bus bar 10 and shield 16 comprises molded, insulating blocks 20 and 21 lying on opposite sides of the bus bar and having the lower portions of their opposed faces as at 22 and 23 molded to the exact contour of the tubular portion 17 and the wing portions 18 but terminating at said wing portions to leave the vertical portions free to move laterally. In this manner, the blocks 20 and 21 back up the shield and form a solid abutment against which the wing portions abut when in normal position.

The blocks 20 and 21 as stated are molded from insulating material and such materials as Ryertex or Micarta, which are fabrics saturated with liquids, molded under pressure and baked, have been found to be satisfactory.

The blocks 20 and 21 at their opposed faces above the tubular portion 17 of the shield diverge from the top of the blocks downwardly to form a V-shape space 24 with the upper ends of the blocks being in engagement as at 25. Thus, as will presently appear, when the blocks are placed on opposite sides of the bus bar and clamping pressure applied thereto, the blocks fulcrum about the point 25 to clamp the bus bar and the space 24 permits such action.

The blocks 20 and 21 are also provided at their upper faces with rectangular recesses 26 and 27 intermediate the length of the blocks for the reception of a supporting bolt to be described later, and also with spaced transverse bores 28, with the bores of one block aligning with the bores in the opposite block for the reception of clamping bolts 29 having kerfed heads 30 and reduced threaded ends 31 receiving thereon on spring washers 32 and tightening nuts 33 by means of which the blocks may be clamped to the bus bar.

In order to prevent injury to the molded blocks 20 and 21, there are provided two sheet metal reinforcing angle plates 34 and 35 of the same size as the blocks and which lie against the outer faces of the blocks and extend inwardly toward each other at the upper edges.

These plates are yieldable, and are provided with apertures 36 aligning with the bores 28 in the blocks and through which the bolts 29 pass so that the clamping thrust is against the angle plates, and the pressure is equally distributed to the blocks throuhgout the length thereof thereby providing tight engagement between the blocks and bus bar and since portions of the opposing faces of the blocks underlie the rounded portion 11 of the bus bar 10, it will be seen that the bus bar cannot fall from between the blocks.

The upper flanges 37 of the plates 34 and 35 abut, and intermediate the length thereof, and in alignment with the recesses 26 and 27, are notches 38 through which the shank 39 of a threaded supporting bolt extends. The bolt is provided with a non-circular head 40 here shown as hexagonal which is received in the recesses 26 and 27 in the blocks 20 and 21, and is so dimensioned that it cannot turn in said recesses when the bolt is secured to its support.

In the recesses 26 and 27 and lying between the bolt head and the walls thereof is a U-shaped, metallic channel member extending across the width of both blocks so that any turning thrust of the bolt is taken by the channel, and chewing of the blocks by the bolt head is prevented.

As clearly seen from the drawings, the notches 38 in the flanges 37 embrace the bolt shank 39 and thereby position the bolt centrally of the combined width of the blocks 20 and 21 so that a symmetrical support for the bus bar is obtained.

The shank 39 of the supporting bolt is of such length that it may be projected through a supporting member 42 and receives thereon a spring washer 43 and a nut 44 threaded onto the shank.

As stated, it is a fact that in long runs of bus bars, the supporting structures as well as the bus bar itself contract and expand under varying climatic conditions, and unless relative longitudinal movement can take place between the bus bar and its support, damage will occur. This is overcome by lubricating the inner wall of the tubular portion 17 of the shield 16 with any suitable lubricant such as Vaseline or the like so that slippage between the bus bar 10 and clamping blocks 20 and 21 may take place when contraction or expansion takes place.

From the foregoing, it is apparent that this invention provides an extremely simple, sturdy and inexpensive insulated bus bar supporting clamp that not only supports the bus bar, but also securely clamps the bus bar shield in place around the bus bar; that the clamping blocks are protected against injury by metallic reinforcing plates on one side and engagement with the resilient shield on the other side thereof, and that extremely high clamping pressure may be imposed on the clamping blocks, so as to be equally distributed along the bus bar to insure long life and that no appreciable maintenance problems are presented. In addition, the supporting clamp permits relative contraction and expansion of the bus bar due to varying climatic conditions in order to avoid warpage, fracture or distortion of the installation.

I claim:

1. In a trolley system, a bus bar, means for supporting said bus bar comprising blocks on opposite sides thereof and engaging the bus bar therebetween, said blocks having aligned, transversely extending recesses in their upper edges, reinforcing plates on the outer faces of said blocks terminating in inwardly directed flanges at their upper end overlying the recesses in said block, a supporting bolt projecting between said flanges and having an enlarged head lying in said recesses beneath and engaging said flanges, and means for securing said bolt to a support.

2. In a trolley system, a bus bar, means for supporting said bus bar comprising blocks on opposite sides thereof and engaging the bus bar therebetween, said blocks having aligned, transversely extending rectangular recesses in their upper edges, reinforcing plates on the outer faces of said blocks terminating in inwardly directed flanges at their upper end overlying the recesses in said block, a supporting bolt projecting between said flanges and having an enlarged non-circular head lying in said recesses beneath and engaging said flanges, and means for securing said bolt to a support, said bolt head engaging the side walls of the recesses to prevent turning of said head in the recesses.

3. In a trolley system, a bus bar, means for supporting said bus bar comprising blocks on opposite sides thereof and engaging the bus bar therebetween, said blocks having aligned, transversely extending recesses in their upper edges, reinforcing plates on the outer faces of said blocks terminating in inwardly directed flanges at their upper end overlying the recesses in said block, a supporting bolt projecting between said flanges and having an enlarged head lying in said recesses beneath and engaging said flanges, a metallic, U-shaped channel lying in said recesses between the bolt head and side walls of the recess to prevent damage to the blocks by turning movements of the bolt head, and means for securing said bolt to a support.

4. In a trolley system, a bus bar, said bar comprising a generally flat elongated strip of conducting metal having its upper edge rounded, a constricted waist portion beneath said upper edge and an elongated lower edge, a shield for said bus bar composed of flexible insulating material having a tubular socket extending along the upper edge thereof, and surrounding and intimately hugging the rounded edge of the bus bar, said shield having oppositely extending wing portions flaring outwardly from opposite sides of said tubular socket and terminating in downwardly directed portions extending below the bus bar and having their lower ends curved toward each other to form a chamber adapted to receive a sliding shoe which engages the bus bar, means for supporting said bus bar comprising insulating clamping blocks lying on opposite sides of the bus bar in engagement with the tubular socket of said shield, said blocks having aligned transversely extending rectangular recesses in their upper edges, reinforcing plates on the outer faces of said blocks terminating in inwardly directed flanges at their upper ends overlying the recesses in said blocks, a supporting bolt projecting between said flanges and having an enlarged non-circular head lying in said recesses beneath and engaging said flanges, means for securing said bolt to a support with the bolt head in engagement with the side walls of the recesses to prevent turning of the head in said recesses, and means for urging the insulating blocks toward each other.

5. In a trolley system, a bus bar, means for supporting said bus bar comprising blocks on opposite sides thereof and engaging the bus bar therebetween, means for clamping the blocks to the bus bar, the inner opposed faces of said blocks diverging downwardly away from each other and the upper edges of said faces being in contact whereby a V-shaped space is provided between said blocks, said space permitting the blocks to fulcrum about said point of contact and into squeezing engagement with said bus bar, said blocks having aligned, transversely extending recesses in their upper edges, reinforcing plates on the outer faces of said blocks terminating in inwardly directed flanges at their upper ends overlying the recesses in said blocks, a supporting bolt projecting between said flanges and having an enlarged head lying in said recesses beneath and engaging said flanges, and means for securing said bolt to a support.

References Cited in the file of this patent

UNITED STATES PATENTS

| | | |
|---|---|---|
| 895,397 | Brazelle | Aug. 4, 1908 |
| 1,955,692 | Thomas | Apr. 17, 1934 |
| 2,668,199 | Connell | Feb. 2, 1954 |